May 13, 1952     G. J. SODERBERG ET AL     2,596,181
WOOD FASTENER
Filed July 20, 1949
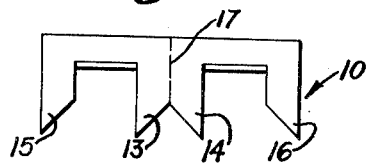
Fig. 1
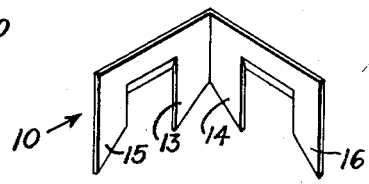
Fig. 2
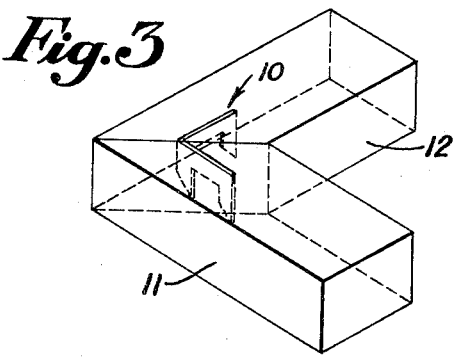
Fig. 3
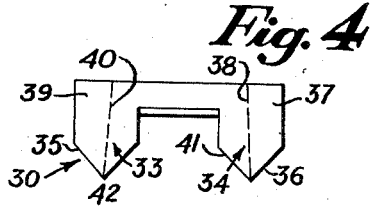
Fig. 4
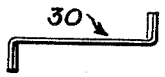
Fig. 5
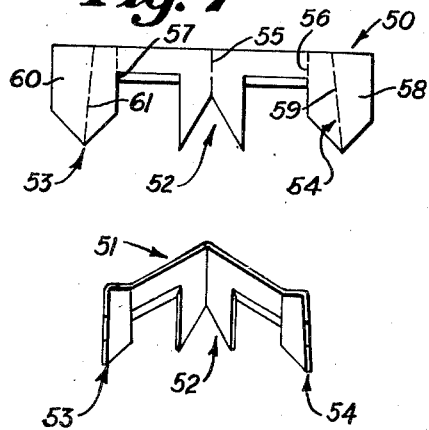
Fig. 7
Fig. 8
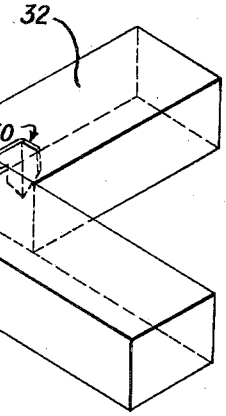
Fig. 6
INVENTORS
GUSTAVE J. SODERBERG &
THEODORE PACKARD
BY
ATTORNEYS Patented May 13, 1952

2,596,181

UNITED STATES PATENT OFFICE 2,596,181

WOOD FASTENER

Gustave J. Soderberg, Babylon, N. Y., and Theodore Packard, East Orange, N. J.; said Packard assignor to E. B. Packard Co., Inc., New York, N. Y., a corporation of New York Application July 20, 1949, Serial No. 105,678

1 Claim. (Cl. 85—11)

This invention relates to improvements in wood fasteners or joiners.

The attachment of two wooden members has always presented a problem and for which many ingenious solutions have been proposed. Known modern metal fasteners of corrugated form have a tendency to split many types of wood by completely severing the wood fibers over the entire length of the fastener. In the case of the fasteners provided with a series of teeth along the entering edge, a lot of metal is exposed and the fastener cannot be driven flush with or below the surface of the wood.

It is an object of the instant invention to provide a fastener which will not split the wood fibers when inserted.

Another object is to provide a fastener which can be driven flush with the wood members and expose a minimum of metal.

A further object is to create a fastener which, with simple adaptation, can be driven below the surface of the wood leaving no metal exposed at the surface.

It is also an object of the instant invention to provide a fastener of such simple construction that the benefits of the device can be brought to a greater number.

Other objects of the instant invention will become apparent in the course of the following specification.

In the accomplishment of these objectives, the improved wood fastener is made from any metal or material of suitable toughness or strength in three forms. In the first form or embodiment, the fastener is designed primarily for joining two wooden members fitted together along a miter joint and is characterized in that the teeth are so formed that when the fastener is inserted the wooden members are actually forced toward each other. In the second embodiment, the fastener is intended for use chiefly with butt joints and is characterized by having the end teeth turned in such a manner that the wooden members even in the case of butt joints are pulled together while the fastener is being inserted. In the third embodiment, the fastener is like that of the first embodiment except that a portion of the end teeth are turned.

The invention will appear more clearly from the following detailed description when taken in connection with the accompanying drawing showing by way of example preferred embodiments of the inventive idea.

In the drawings:

Figures 1 through 3 show the first embodiment of the wood fastener or joiner for wooden members brought together along a miter joint, constructed in accordance with the principles of the invention, and in which;

Figure 1 is a developed plan view of the fastener.

Figure 2 is a perspective view of the formed fastener shown in Figure 1.

Figure 3 is a view in perspective of two wooden members brought together along a miter and attached with the fastener shown in Figure 2.

Figures 4 through 6 show the second embodiment of the improved wood fastener for butt joints and in which;

Figure 4 is a developed plan view of the fastener.

Figure 5 is a top view of the fastener shown in Figure 4 after a portion of the end teeth are turned.

Figure 6 is a view in perspective of two wooden members attached by the fastener shown in Figure 5 along a butt joint.

Figures 7 and 8 show the third embodiment of the improved fastener, also for a miter joint as in the case of the first embodiment, and in which:

Figure 7 is a developed plan view of the fastener.

Figure 8 is a perspective view of the fastener shown in Figure 7 after being formed.

Referring now in greater detail to the first embodiment of the improved wood fastener or joiner shown in Figures 1, 2, and 3 where like reference numerals indicate like parts, reference numeral 10 indicates the fastener, and numerals 11 and 12 the wooden members to be attached along a miter joint.

The fastener 10, shown flat in Figure 1, may be struck from any metal or material of suitable toughness and strength in such a manner that there is formed along the entering edge, the central depending teeth 13 and 14 and the end teeth 15 and 16. One-half of the flat body portion shown in Figure 1 is then turned toward the other along the vertical center line 17 until the planes of the turned portions form an angle of 90° with each other. The bases of the teeth 13 and 14 are directed inwardly and upwardly toward the vertical center line 17 which forms the common side of the teeth while the opposite sides are perpendicular to the horizontal center line of the fastener. The bases of the end teeth 15 and 16 are also directed inwardly and upwardly toward the vertical center line 17 with both of the outside edges at an angle of 90° to the horizontal center line. Of course, the angular bases of the teeth as well as the entering edge of the body between the teeth may be provided with a cutting edge if desired.

The operation with the fastener 10 is as follows:

The ends of any wooden members 11 and 12 may be placed in a miter box and cut in the usual manner so that the plane of the jointure will form equal angles with the longitudinal center lines of the members when placed end on end, the included angle of which will then be 90°. The fastener 10 is placed over the contiguous surface portions of the miter joint with the vertical center line 17 of the fastener in the plane of the jointure and the turned sides of the fastener parallel to the longitudinal center lines of the wooden members as shown in Figure 3. Then, with any suitable hammer, the fastener 10 is driven into the wood until it is completely imbedded in the wooden members. While being driven, the inwardly and upwardly inclined bases of the teeth 14 and 16 in the wooden member 12 will force that member in the direction of the jointure. At the same time, the oppositely inclined bases of the teeth 13 and 15 entering the member 11 will force that member toward the jointure. Thus, both of the wooden members 11 and 12 to be joined are forced together at the joint while being joined in a more simple and effective manner than heretofore possible. Of course, the fastener 10 can be made of any height in accordance with the dimensions of the wooden members and by using an especially designed hammer could be made of any reasonable length. In addition, the fastener 10 may be countersunk for finishing, and there may be similar teeth intermediate the end and central teeth. Obviously, a plurality of fasteners 10 could be used and along any edge of the joined members.

In the second embdiment of the improved wood fastener shown in Figures 4, 5, and 6, reference numeral 30 indicates the fastener, and numerals 31 and 32 the wooden members to be attached along a butt joint.

The fastener 30 may also be struck from suitable material as in the first embodiment but with the pointed end teeth 33 and 34 only as shown in Figure 4. The outer surface portions of the pointed end teeth 33 and 34 are turned in opposite directions along the lines 38 and 40 which are inclined inwardly and upwardly so that the outer surface portions 39 and 37 are likewise inclined inwardly and upwardly when turned to force, for example, the wooden member 32 toward the other wooden member 31 when the fastener 30 is inserted and the wooden member 31 toward the other wooden member 32. In this way, both ends of the fastener 30 will have a tendency to draw the wooden members 31 and 32 together thereby producing a joint superior to any formed with known fasteners.

In operation, the pointed teeth 33 and 34 of the fastener 30 are placed across the line of jointure of the wooden members and driven home, the wooden members being drawn together in the manner previously mentioned. By turning the ends of the teeth 33 and 34 in opposite directions, it has been found that the fastener 30 is virtually locked in the wood without substantially weakening the wooden members.

In the third embodiment of the wood fastener shown in Figures 7 and 8, reference numeral 50 indicates the fastener prior to being formed into the finished fastener shown in Figure 8 and indicated by reference numeral 51.

The fastener 50, as in the previous cases, may be struck from suitable material. Depending from the fastener 50 is the double pointed tooth 52 and the end teeth 53 and 54. One-half of the preformed fastener 50 is turned toward the other half along the vertical center line 55 until the included angle is 90°. The tooth 54 is then turned outwardly along the dashed vertical line 56 and the tooth 53 is also turned outwardly along the dashed line 57. The surface portion 58 of the tooth 54 is then turned inwardly along the inwardly and upwardly directed dashed line 59 while the surface portion 60 of the tooth 53 is similarly turned along the similarly inclined line 61. The upwardly and inwardly inclined edges of the central tooth 52 of the fastener 50 if used in connection with the miter joint shown in Figure 3 will pull together the wooden members 11 and 12 in the same manner as the central tooth of the first embodiment fastener 10 previously mentioned. In a similar manner, the inwardly and upwardly directed edges of the end teeth 53 and 54 will force the wooden members together. At the same time, the upwardly and inwardly inclined surface portions 60 and 58 of the end teeth 53 and 54, respectively, will also force together the wooden members forming the joint.

The operation with the fastener 50 of the third embodiment is similar to that previously described for the first embodiment. However, it is to be noted that either embodiment could be used for either a miter or butt joint while the novel manner of turning the ends of the fastener 50 provides what is tantamount to a double lock and in some instances even more effective than the single locking means of the previously mentioned fastener 30 primarily adapted for butt joints.

It will be understood that the invention is not limited to the exact disclosure herein described but may lend itself to a variety of expressions within the scope of the appended claim.

What is claimed is:

A fastener for attaching two wooden members along a joint, the fastener comprising a rigid body, a central tooth depending from the body on either side of the vertical center line thereof, the outer edges of the central tooth being parallel to the vertical center line of the body and the base being inclined inwardly and upwardly from the bottom of each of the outer edges to the vertical center line; the fastener further comprising an end tooth depending from each of the extremities of the body, said teeth being pointed with the sides forming the point inclined upwardly to the vertical side edges of the tooth parallel to the vertical center line of the fastener, the end teeth being further turned laterally outwardly along the inner vertical side edges extended, the extreme surface portions of the teeth being further turned laterally inwardly along a line extending from the point inwardly and upwardly toward the vertical center line of the fastener; one-half of the rigid body being further turned laterally inwardly toward the other along the vertical center line to form an included angle of substantially 90°.

GUSTAVE J. SODERBERG.
THEODORE PACKARD.

REFERENCES CITED

The following references are of record in the file of this patent:

UNITED STATES PATENTS

| Number | Name | Date |
| --- | --- | --- |
| 433,443 | Brown et al. | Aug. 5, 1890 |
| 553,886 | Wyland | Feb. 4, 1896 |
| 1,410,514 | Ryan | Mar. 21, 1922 |
| 2,398,603 | Soderberg | Apr. 16, 1946 |